(12) United States Patent
Takahashi et al.

(10) Patent No.: US 7,863,539 B2
(45) Date of Patent: Jan. 4, 2011

(54) POSITIONING METHOD OF SPOT WELDING ROBOT

(75) Inventors: Hiromitsu Takahashi, Yamanashi (JP); Toshimichi Aoki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 382 days.

(21) Appl. No.: 12/139,654

(22) Filed: Jun. 16, 2008

(65) Prior Publication Data
US 2009/0001056 A1  Jan. 1, 2009

(30) Foreign Application Priority Data
Jun. 18, 2007  (JP)  ............................. 2007-160353

(51) Int. Cl.
  B23K 37/02  (2006.01)
  B23K 11/25  (2006.01)
  B23K 11/31  (2006.01)
  G01D 18/00  (2006.01)
(52) U.S. Cl. .................. 219/86.7; 219/86.1; 219/86.33; 219/91.2; 705/85; 705/94; 705/105
(58) Field of Classification Search ................. 219/86.1, 219/86.25, 86.33, 86.7, 87, 91.2; 702/85, 702/94, 105
See application file for complete search history.

(56) References Cited

U.S. PATENT DOCUMENTS

| | | | | |
|---|---|---|---|---|
| 5,869,799 A | * | 2/1999 | Arasuna et al. ............ | 219/86.7 |
| 2006/0212169 A1 | | 9/2006 | Luthardt | |

FOREIGN PATENT DOCUMENTS

| | | | |
|---|---|---|---|
| EP | 1657018 A1 | | 5/2006 |
| JP | 06-218554 A | | 8/1994 |
| JP | 06218554 A | * | 8/1994 |
| JP | 06-312274 A | | 11/1994 |
| JP | 09-029453 A | | 2/1997 |
| JP | 09-295158 A | | 11/1997 |
| JP | 10-249539 A | | 9/1998 |
| JP | 2001-030083 A | | 2/2001 |
| JP | 2001-150150 B2 | | 6/2001 |
| JP | 2002-035951 A | | 2/2002 |
| JP | 2002-086276 A | | 3/2002 |
| JP | 2002-096177 A | | 4/2002 |
| JP | 2002-283059 A | | 10/2002 |
| WO | 2005005089 A1 | | 1/2005 |
| WO | WO 2005005089 A1 | * | 1/2005 |
| WO | WO 2005075157 A1 | * | 8/2005 |

OTHER PUBLICATIONS

EP Search Report for 08010821 dated Oct. 17, 2008.

* cited by examiner

*Primary Examiner*—Stephen J Ralis
(74) *Attorney, Agent, or Firm*—Lowe Hauptman Ham & Berner LLP

(57) ABSTRACT

A positioning method of a spot welding robot, the spot welding robot having a movable electrode tip and an opposition electrode tip opposed to the movable electrode tip. The method sandwiches a work piece to be welded between the pair of electrode tips and includes driving the movable electrode tip towards the opposition electrode tip with a servo motor and stopping the movement upon contact based upon a prescribed current value. The method further includes measuring an open separation of two opposing tips between the movable electrode tip and the opposition electrode tip and moving the opposition electrode tip towards the moveable electrode tip based upon the preset value and the open separation of the two opposing tips.

8 Claims, 9 Drawing Sheets

SPOT WELDING POINT BEFORE ALTERATION

OFFSET VALUE TO POSITION OF WELDING POINT
$\varepsilon 1 = \gamma 1 - (p + t1)$

CORRECTING OPERATION TO POSITION OF WELDING POINT

POSITIONING METHOD OF SPOT WELDING ROBOT

CROSS REFERENCE TO RELATED APPLICATIONS

The present application claims the benefit of priority based on Japanese Patent Application No. 2007-160353, filed on Jun. 18, 2007, the disclosure of which is incorporated herein in its entirety by reference.

BACKGROUND OF THE INVENTION

1. Field of the Invention

The present invention relates to a positioning method of a spot welding robot which has a pair of electrode tips, i.e., a movable electrode tip and an opposition electrode tip opposed to the movable electrode tip, and which sandwiches a work piece to be welded between the pair of electrode tips, and while applying pressure, welds the work piece.

2. Description of Related Art

In spot welding performed by a spot welding robot, in general, welding is performed on a work piece between a pair of opposing electrode tips, i.e., a movable electrode tip and an opposition electrode tip by applying a predetermined pressure to it. Thus, welding is performed on the work piece sandwiched between a pair of electrode tips with no gap therebetween. If there is any gap, sputtering is induced during energization of the electrode tips, leading to degradation of welding quality. The work piece is held at a prescribed position by a jig or the like that is disposed around the robot, and the robot approaches to the work piece so as to sandwich it between a pair of electrode tips.

However, the position of the work piece held by the jig or the like may be altered, or the thickness of the work piece may be changed, or the thickness of the work piece may be varied, and as a result, it may not be possible to sandwich the work piece between a pair of electrode tips without producing a gap. Thus, a gap may be produced between the electrode tips and the work piece. In order to avoid occurrence of such a gap, it is necessary to position the pair of electrode tips of the spot welding robot accurately in the plate-thickness direction of the work piece.

An example of conventional method of positioning a spot welding gun is disclosed in Japanese Patent No. 3337448 (Japanese Patent Publication No. 2001-150150). In this method, a reaction force exerted to a robot due to elastic deformation of a work piece when a pair of electrode tips of a spot welding gun is brought into contact with the work piece is determined based on the variation of current value of a servo motor, and the position of the electrode tips is thereby determined. Thus, the reaction force detected by the servo motor that moves the movable electrode tip and the reaction force detected by the servo motor of the robot that moves the opposition electrode tip are monitored respectively, and a contact state of respective electrode tips with the work piece is thereby determined and positions of respective electrode tips can be thereby determined.

In the above-described method, the reaction force detected by the servo motor of the robot includes frictional force in a robot mechanism. Thus, especially in the case of large spot welding gun having a mechanism of low rigidity, since the reaction force at the time of contact is small, the reaction force may not be detected correctly due to the influence of dynamic friction generated in the detecting operation of the robot. Therefore, a position of a work piece cannot be detected in expected positional accuracy, and the position of the opposition electrode tip may not be detected with sufficient accuracy. Although the influence of dynamic friction can be eliminated or reduced by suppressing the speed of detecting operation of the robot, this may increase the time required for detection of the reaction force, and therefore, may increase the time required for the operation for positioning the spot welding robot.

SUMMARY OF THE INVENTION

It is an object of the present invention to provide a positioning method of a spot welding robot, which is easy and does not impair the workability of positioning a welding robot, and which can accurately position an opposition electrode tip and thereby improve the quality and reliability of welding.

In order to attain above object, in accordance with an aspect of the present invention, there is provided a positioning method of a spot welding robot comprising a welding gun having a movable electrode tip capable of being moved forward and backward by means of a servo motor and an opposition electrode tip opposed to the movable electrode tip so as to sandwich a work piece, the method for positioning the opposition electrode tip at a position of a spot welding point in contact with the work piece comprising: (A) moving the welding gun with a separation between the opposition electrode tip and the movable electrode tip kept open and larger than a preset plate thickness of the work piece so as to position the opposition electrode tip and the movable electrode tip on both sides of the work piece in a plate-thickness direction of the work piece, respectively, and temporarily positioning the opposition electrode tip at a stand-by position; (B) moving the movable electrode tip in a direction approaching toward the opposition electrode tip while monitoring a current value of the servo motor driving the movable electrode tip, and when the current value exceeds a prescribed value, determining that the distal end of the movable electrode tip has been brought into contact with the work piece, stopping a movement of the movable electrode tip, and measuring an open separation of two opposing tips between the movable electrode tip and the opposition electrode tip that has been temporarily positioned at the stand-by position; and (C) determining a difference value by subtracting the preset value for the work piece from the open separation of two opposing tips, and moving the opposition electrode tip in a direction approaching toward the movable electrode tip from the stand-by position to the position of a spot welding point to finally position the opposition electrode tip, by using the difference value as the amount of movement of the opposition electrode tip.

With the construction as described above, in the case of spot welding of a work piece of a preset plate thickness, the open separation of two opposing electrode tips between the movable electrode tip that has been temporarily positioned at the stand-by position and the opposition electrode tip is measured, and the amount of movement for the opposition electrode tip is determined by subtracting the preset plate thickness from the open separation of two opposing electrode tips, so that by moving the opposition electrode tip by this amount of movement to the position of spot welding point, the opposition electrode tip can be accurately positioned to the lower surface of the work piece. Therefore, in accordance with the method of the present invention, as compared to the method in which the opposition electrode tip is positioned while monitoring the current value of the servo motor, the opposition electrode tip can be more accurately positioned to the spot welding point by an easier method which does not impair workability of positioning of welding robot. Quality and reliability of welding can be thereby improved.

In accordance with another aspect of the present invention, there is provided a positioning method of a spot welding robot comprising a welding gun having a movable electrode tip capable of being moved forward and backward by means of a servo motor and an opposition electrode tip opposed to the movable electrode tip so as to sandwich a work piece, the method for positioning the opposition electrode tip at a position of a spot welding point in contact with the work piece comprising: (A) moving the welding gun with a separation between the opposition electrode tip and the movable electrode tip kept open and larger than a preset plate thickness of the work piece so as to position the opposition electrode tip and the movable electrode tip on both sides of the work piece in a plate-thickness direction of the work piece, respectively, and temporarily positioning the opposition electrode tip at a stand-by position; (B) moving the movable electrode tip in a direction approaching toward the opposition electrode tip while monitoring a current value of the servo motor driving the movable electrode tip, and when the current value exceeds a prescribed value, determining that a distal end of the movable electrode tip has been brought into contact with the work piece, stopping a movement of the movable electrode tip, and measuring an open separation of two opposing tips between the movable electrode tip and the opposition electrode tip that has been temporarily positioned at the stand-by position; and (C) subtracting from the separation of the two opposing tips a value obtained by adding a difference value between the stand-by position of the opposition electrode tip and a position of a spot welding point already taught as a teaching position of the spot welding robot to the preset plate thickness of the work piece to obtain a offset value for the position of the spot welding point, and correcting said position of the spot welding point based on the offset value.

With the construction as described above, in the case where the position of the work piece is altered and the position of spot welding point for carrying out the spot welding is altered, a offset value for the already taught position of spot welding point can be calculated by subtracting, from the separation of the opposing tips, a value obtained as the sum of the preset plate thickness and the difference value between the stand-by position of the opposition electrode tip and the already taught position of the spot welding point. Therefore, the taught position of the spot welding point can be easily corrected, and the spot welding can be carried out at the accurate position of the welding point. In a case where there are a multiplicity of welding locations in the work piece, the offset value obtained for one location can be applied to correct the positions of spot welding point for a multiplicity of welding locations, so that the correction of positions of spot welding point for a multiplicity of welding locations can be performed collectively.

In the positioning method of the spot welding robot, the position of the spot welding point may be used as a teaching position of the spot welding robot.

By using the position of spot welding as the teaching position, the spot welding robot can be operated based on the operation program and precision of repeated positioning can be improved.

The positioning method of spot welding robot may further comprise: moving the movable electrode tip in the direction approaching toward the opposition electrode tip with the work piece interposed between the opposition electrode tip positioned at the position of spot welding point and the movable electrode tip, sandwiching the work piece under prescribed applied pressing force to measure a closed separation of the two opposing tips between the opposition electrode tip and the movable electrode tip, and determining the difference value by subtracting the preset plate thickness of the work piece from the closed separation of the two opposing tips; and comparing the difference value with a predetermined reference value, and sounding an alarm when the difference value is greater than the reference value.

With such a construction, in the state of the welding robot being positioned at the position of spot welding point, by comparing the difference value obtained by subtracting the preset plate thickness of the work piece from the closed separation of the opposing tips between the opposition electrode tip and the movable electrode tip when the work piece is sandwiched under prescribed applied pressing force with the reference value, variation of the plate thickness of the work piece, that is, whether or not the variation of the plate thickness is within an allowable limit, can be evaluated. By sounding an alarm when the difference value is greater than the reference value, it is possible to caution an operator that correction of the position of spot welding point of the opposition electrode tip becomes necessary due to variation of the plate thickness of the work piece.

The positioning method of spot welding robot may further comprise recording a result of comparison of the difference value with a predetermined reference value so as to permit review thereof.

With such a construction, by recording the difference value in a memory of the servo controller so as to permit review thereof, an operator can recognize change in the plate thickness of the work piece, and can correct the position of spot welding point of the opposition electrode tip based on the difference value.

In the positioning method of spot welding robot, the closed separation of opposing tips may be regarded as a newly set plate thickness of the work piece, and the position of spot welding point can be corrected based on the difference value.

Thus, the difference value is determined as change in plate thickness of the work piece, and by correcting the position of spot welding point based on the difference value, change in plate thickness can be flexibly dealt with, and reliability of the welding quality can be thereby improved.

In the positioning method of spot welding robot, it is also possible to position the opposition electrode tip at the corrected position of the spot welding point.

Thus, by moving to the corrected position of spot welding point, accurate positioning to the position of spot welding point becomes possible.

In the positioning method of spot welding robot, when there are a multiplicity of spot welding locations in the work piece, the offset value of the position of spot welding point in one spot welding location can be used as a offset value of the position of spot welding point in other spot welding locations.

Thus, by applying the offset value obtained for one welding location as a offset value for other welding locations, new positions of spot welding point of the opposition electrode tip for a multiplicity of welding locations can be collectively obtained. In prior art, when an operator corrects the position of the spot welding point of the opposition electrode tip, correction of the position of spot welding point is carried out individually by moving the welding robot for each welding location. In accordance with the present invention, by applying the offset value of the position of spot welding point for one spot welding location to other welding locations, the position of spot welding point for a multiplicity of welding locations can be obtained automatically and collectively. Thus, time required for positioning of a welding robot can be substantially reduced, and workability of positioning operation can be improved.

BRIEF DESCRIPTION OF THE DRAWINGS

The above and other objects, features, and advantages of the present invention will become more apparent from the following description of preferred embodiments with reference to appended drawings, in which.

DETAILED DESCRIPTION

Figure 1:
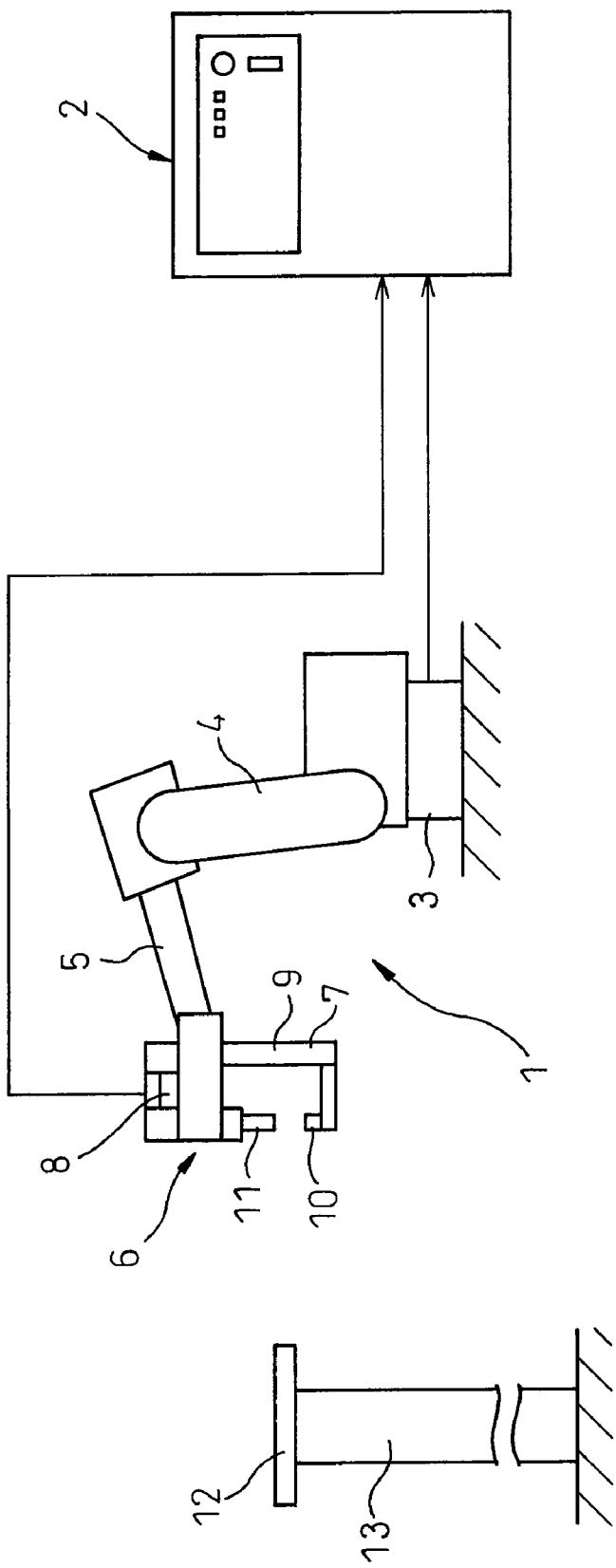
FIG. 1 is a front view of a processing system for carrying out a positioning method of spot welding robot according to the present invention.

The present invention will be described in detail below with reference to drawings showing specific examples of a preferred embodiment. FIG. 1 is a processing system for carrying out a positioning method of a spot welding robot according to an embodiment of the present invention. The processing system includes a multi-joint type spot welding robot 1 and a robot controller 2 for controlling the spot welding robot, although the system may include other components. This processing system is adapted to position an opposition electrode tip to the position of spot welding point, that is, a position in contact with the lower surface of a work piece.

Spot welding robot 1 is a general 6 axes vertical multi-joint type robot, and has a base 3 fixed to a floor, a lower arm 4 connected to base 3, an upper arm 5 connected to lower arm 4, and a spot welding gun 6 rotatably provided at the distal end of upper arm 5. Lower arm 4 is mounted pivotably about a vertical first axis to base 3, and rotatably about a horizontal second axis to base 3. At the upper end of lower arm 4, the proximal end of upper arm 5 is mounted rotatably about a horizontal third axis. At the distal end of upper arm 5, via an unshown wrist mounted rotatably about a fourth axis that is parallel to the axis of upper arm 5 and about a fifth axis orthogonal to axis of upper arm 5, the spot welding gun is provided rotatably about a sixth axis orthogonal to the fifth axis.

Spot welding gun 6 has an unknown link member rotatably connected to the wrist, a gun arm 7 integrally formed in one unit with the link member in the shape of Japanese Katakana "ko", and a servo motor 8 for sandwiching a work piece. Gun arm 7 has an opposition electrode tip 10 integrally formed with L-shaped frame 9, and a movable electrode tip 11 opposing to opposition electrode tip 10 and movable to and from opposition electrode tip 10. The pair of electrode tips 10, 11 are bar-shaped members, and are disposed coaxially in the plate-thickness direction of work piece 12 that is sandwiched between the pair of electrode tips 10, 11.

Opposition electrode tip 10 is integrally formed with L-shaped frame 9 in one unit, and its position and attitude are controlled by the servo motors which drive the respective axes of robot 1. Thus, in the case of positioning opposition electrode tip 10 in the plate-thickness direction of work piece 12 to the teaching position (the position of spot welding point), opposition electrode tip 10 is driven by the servo motors which drive the respective axes of robot 1. Movable electrode tip 11 is adapted to be driven in the direction of a pair of electrode tips 10, 11 by servo motor 8 of spot welding gun 6 for sandwiching the work piece.

An unshown encoder is mounted to servo motor 8 for sandwiching the work piece. Rotation angle about the axis of servo motor 8 is detected by the encoder. By means of feedback control, the detected rotation angle may be fed back so that the movable electrode tip can be accurately positioned to the prescribed position. When a pair of electrode tips 10, 11 come into contact, since the position of movable electrode tip 11 upon closure of the open space of a pair of electrode tips 10, 11 sandwiching work piece 12 has been stored as a reference position, the separation between the opposing pair of electrode tips 10, 11 can be measured based on the rotation angle of servo motor 8.

From the pair of electrode tips 10, 11, robot controller 2 can drive movable electrode tip 10 in the opposing direction by means of servo motor 8 so as to control the pressing force applied to work piece 12 sandwiched between the pair of electrode tips 10, 11, and composes a digital servo circuit comprising an unshown CPU, various memories, I/O interface and the like to perform the position control, velocity control, and torque (current) control of servo motors.

Operation program and teaching data for spot welding robot 1 are stored in the memories as storage means. Teaching data include data of the spot welding point, that is, the position and attitude of spot welding robot 1 and spot welding gun 6 when the spot welding is performed on a multiplicity of welding locations of work piece 12. The position and attitude of spot welding robot 1 are not particularly limited, but in the present embodiment, a pair of electrode tips 10, 11 of spot welding gun 6 are arranged in vertical direction, and opposition electrode tip 10 is positioned to a position coinciding with the lower surface of work piece 12 (spot welding position). In the present embodiment, a teaching method for teaching a position of opposition electrode tip 10 to robot 1 according to the present invention is described in detail below.

Figure 2:
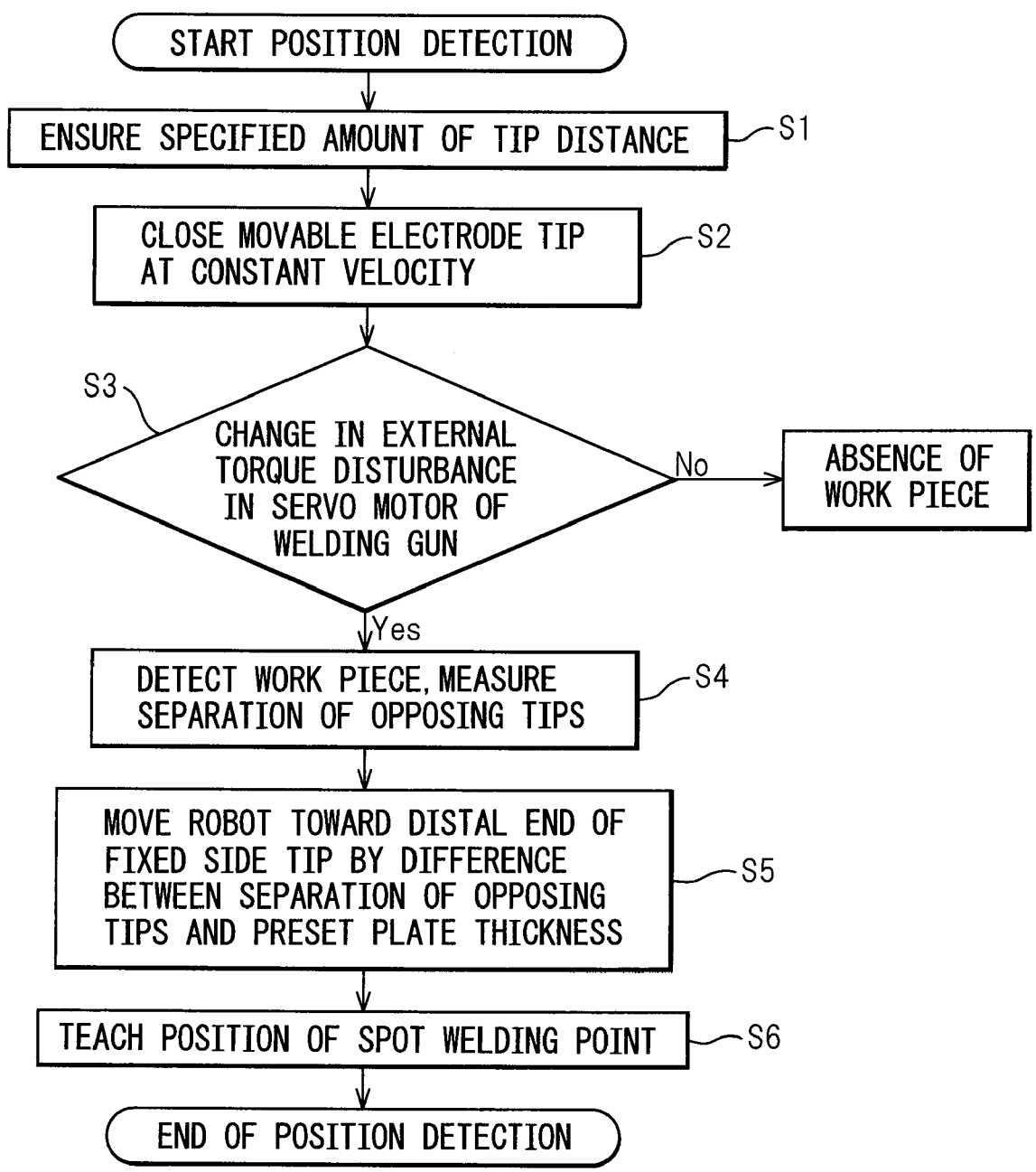
FIG. 2 is a flow chart of a positioning method of spot welding robot according to an embodiment of the invention.

FIG. 2 is a flow chart showing a positioning method of a spot welding robot 1 according to an embodiment of the invention. The method for positioning the opposition electrode tip 10 to a position of spot welding point in contact with the lower surface of work piece 12, comprises steps S1-S5. In the present embodiment, after opposition electrode tip 10 has been moved to the position of spot welding point, the method further comprises step S6 of storing the position of the spot welding point as the teaching position for the welding robot in the memory of robot controller 2. Thus, once the position of spot welding point has been determined, the welding robot can be controlled to move to the position of spot welding point in accordance with the operating program. By designating the destination of the movement of the robot as the teaching position of the operating program, spot welding can be repeated with high precision of positioning.

Figure 3A:
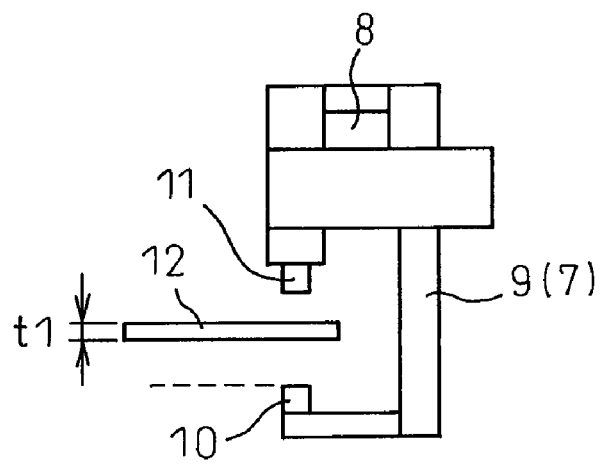
FIG. 3A is a view of a work piece positioned between a pair of electrode tips in order to determine the position of spot welding point of an opposition electrode tip.

First, at step S1, as shown in FIG. 3A, the opposing separation between opposition electrode tip 10 and movable electrode tip 11 of the spot welding gun is provided so as to be larger than preset plate thickness t1 of work piece 12 (FIG. 1). Then, spot welding robot 1 is moved and spot welding gun 5 (opposition electrode tip 10) is temporarily positioned such that opposition electrode tip 10 and movable electrode tip 11 are positioned respectively on both sides in the plate-thickness direction of work piece 12 held by a jig 13. In this state, the distal end of opposition electrode tip 10 is disposed at a stand-by position.

Next, at step S2, movable electrode 11 is moved at a constant velocity in the direction approaching to opposition electrode tip 10. Thus, movable electrode 11 is moved such that the open separation between a pair of electrode tips 10, 11 tends to be closed.

Figure 3B:
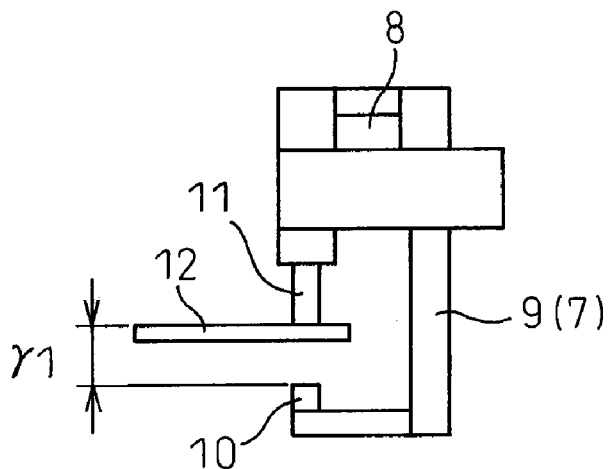
FIG. 3B is a view of a movable electrode tip brought into contact with the upper surface of the work piece.
Figure 4:
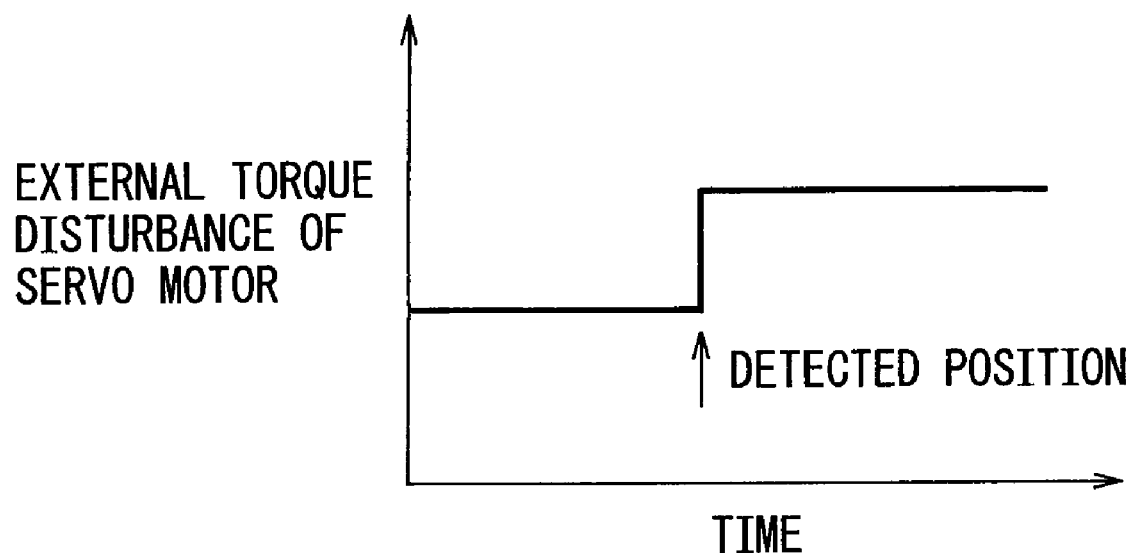
FIG. 4 is a view explaining a step-wise change in the current of the servo motor upon contact of the movable electrode tip with the upper surface of the work piece.

At step S3, the current value of the sandwiching servo motor 8 which drives movable electrode tip 11 is monitored to determine when the current value exceeds a prescribed value. By monitoring the current value, it is possible to detect the occurrence of an external torque disturbance. In this embodiment, as shown in FIG. 3B, occurrence of an external torque disturbance indicates that movable electrode tip 11 is brought into contact with the upper surface of work piece 12. Specifically, as shown in FIG. 4, for example, a step-wise change in the current value indicates the occurrence of the external torque disturbance and the contact of movable electrode tip 11 with the upper surface of work piece 12. If the external torque disturbance does not occur, it is determined that work piece 12 does not exist.

At step S4, when an external torque disturbance is detected, it is determined that movable electrode tip 11 has come into contact with work piece 12, and movement of movable electrode tip 11 is stopped and open separation γ1 of the opposing tips between the distal end of movable electrode tip 11 and opposition electrode tip 10 in the stand-by position is measured.

Figure 3C:
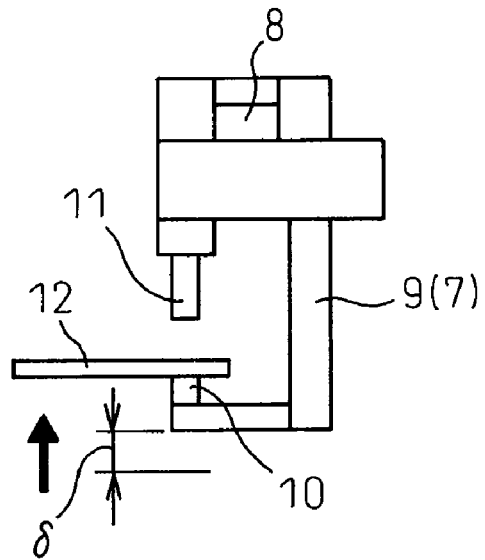
FIG. 3C is a view of the opposition electrode tip shifted upward by δ.

At step S5, as shown in FIG. 3C, the difference obtained by subtracting, from open separation γ1 of the opposing tips, a preset plate thickness t1 of work piece 12 that has been set in advance, is set as the amount of movement δ of opposition electrode tip 10, and opposition electrode tip 10 is moved from the stand-by position at which the welding robot 1 has been temporarily positioned, in the direction approaching to movable electrode tip 11 to the position of the spot welding point. Opposition electrode tip 10 is thereby finally positioned to the position of the spot welding point.

Finally, at step S6, after the teaching position of opposition electrode tip 10 is stored in the memory as the teaching data, the process is terminated. Based on the teaching data, the spot welding robot can position opposition electrode tip 10 to the teaching position, and can perform spot welding operation repeatedly. Since the position stored at step S6 as the teaching data is equivalent to the target value for the final positioning at step S5, and the target position of the final positioning operation can be determined when the amount of movement δ is obtained, it is also possible to carry out step S6 before the final positioning operation has been accomplished.

Figure 5:
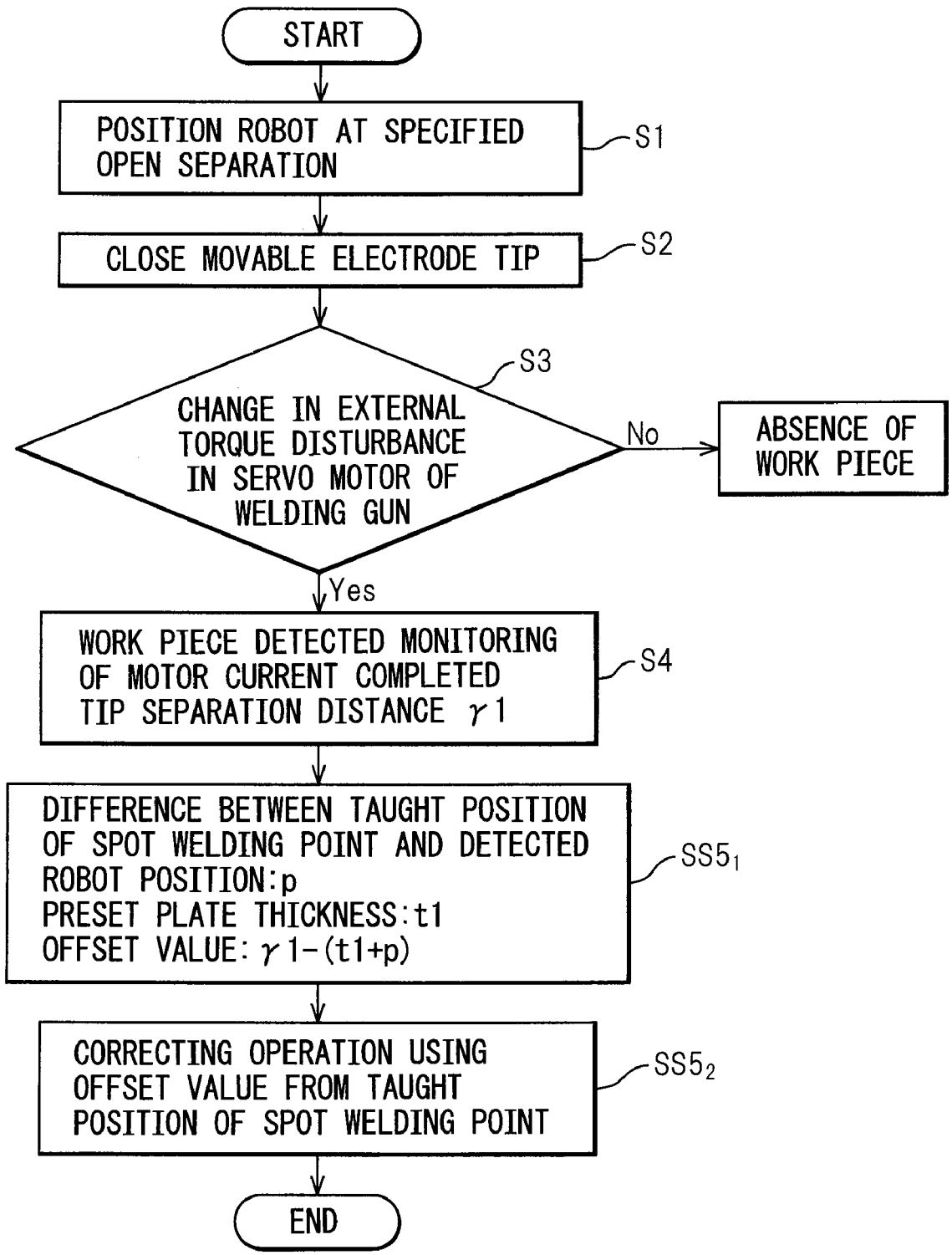
FIG. 5 is a flow chart of a method of correcting the position of spot welding point of the opposition electrode tip when the position of the work piece is altered.

Next, a method of correcting the already taught position of spot welding point will be described based on FIG. 5 and FIG. 6. Flow chart shown in FIG. 5 differs from the flow chart shown in FIG. 2 in that it has step $SS5_1$ of subtracting from the open separation of opposing tips a sum of preset plate thickness of the work piece and the difference value between the stand-by position of the opposition electrode tip and the already taught position of spot welding point, and step $SS5_2$ of performing correcting operation. Steps common to the flow charts of FIG. 2 and FIG. 5 are denoted by same symbols. Each step in the flow chart will be described below with reference to FIGS. 6A-E.

Figure 6A:
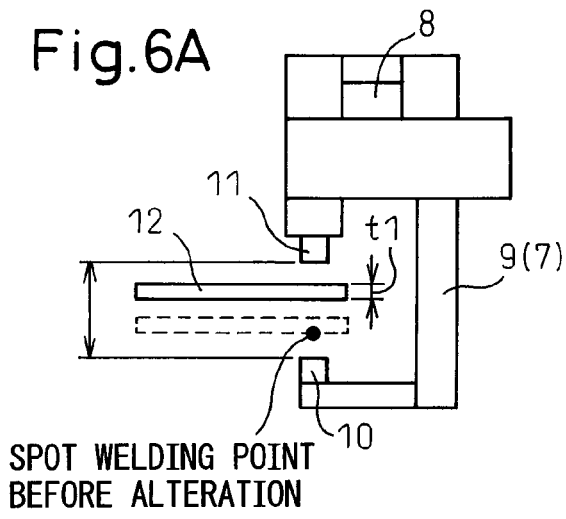
FIG. 6A is a view of a work piece positioned between an open pair of electrode tips in order to determine the position of spot welding point of the opposition electrode tip.
Figure 6D:
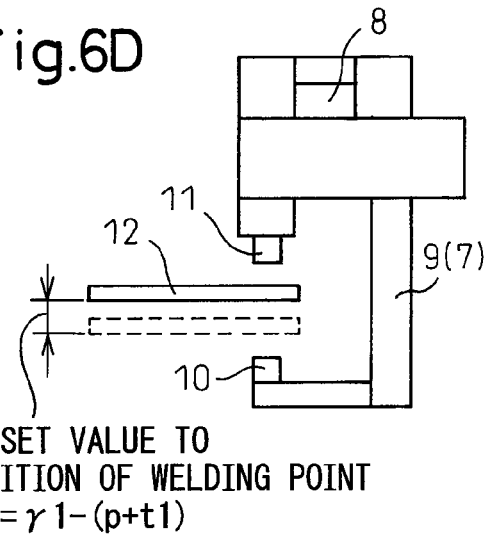
FIG. 6D is a view showing the offset value ∈1 for the position of spot welding point.

At step S1, the opposing separation between opposition electrode tip 10 and movable electrode tip 11 of the spot welding gun is provided so as to be larger than preset plate thickness t1 of the work piece. Then, spot welding robot 1 is moved and spot welding gun 6 (opposition electrode tip 10) is temporarily positioned such that opposition electrode tip 10 and movable electrode tip 11 are positioned respectively on both sides in the plate-thickness direction of work piece 12 held by a jig 13 (FIG. 1). In this state, as shown in FIG. 6A, the distal end of opposition electrode tip 10 is disposed at a stand-by position.

Next, at step S2, movable electrode 11 is moved at a constant velocity in the direction approaching to opposition electrode tip 10. Thus, movable electrode 11 is moved such that the open separation between a pair of electrode tips 10, 11 tends to be closed.

Figure 6B:
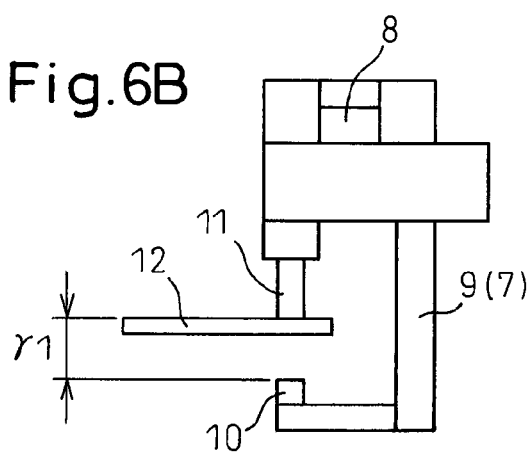
FIG. 6B is a view showing an open separation γ1 of opposing tips when the movable electrode tip comes into contact of with the upper surface of the work piece.
Figure 6E:
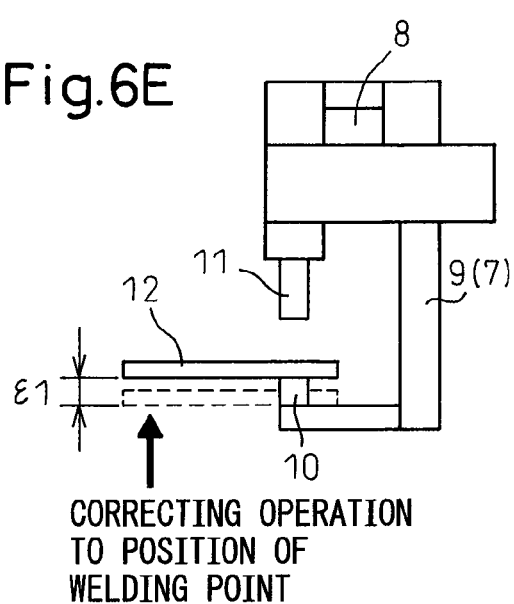
FIG. 6E is a view showing the corrected position of spot welding point.

At step S3, the current value of sandwiching servo motor 8 which drives movable electrode tip 11 is monitored to determine when the current value exceeds a prescribed value. By monitoring the current value, it is possible to detect the occurrence of an external torque disturbance. In this embodiment, occurrence of an external torque disturbance indicates that movable electrode tip 11 is brought into contact with the upper surface of work piece 12. Specifically, a step-wise change in the current value indicates the occurrence of the external torque disturbance, and hence, the contact of movable electrode tip 11 with the upper surface of work piece 12. If the external torque disturbance does not occur, it is determined that work piece 12 does not exist. In FIG. 6B, movable electrode tip 11 is shown as being in contact with the upper surface of work piece 12.

At step S4, when an external torque disturbance is detected, it is determined that movable electrode tip 11 has come into contact with work piece 12, and movement of movable electrode tip 11 is stopped and open separation γ1 of the opposing tips between the distal end of movable electrode tip 11 and the opposition electrode tip 10 in the stand-by position is measured.

Figure 6C:
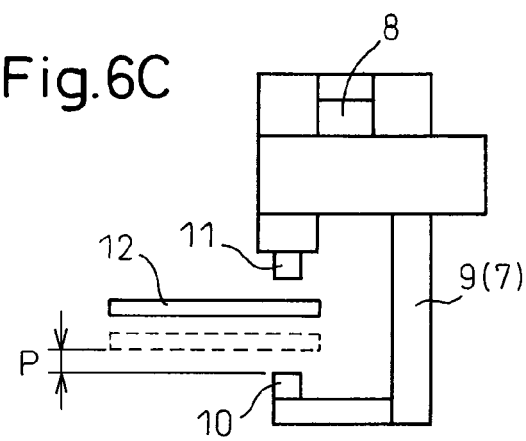
FIG. 6C is a view showing the difference value p between an already taught position of spot welding point and the stand-by position of the opposition electrode tip.

At step $SS5_1$, as shown in FIG. 6C, after the difference value p between the taught position of spot welding point and the stand-by position of the opposition electrode tip is determined, offset value ∈1 is determined by subtracting a value obtained by adding preset plate thickness t1 of the work piece to this difference value from open separation γ1 of the opposing tips.

Finally at step $SS5_2$, offset value ϵ1 obtained at step $SS5_1$ is used as the offset value of movement to move opposition electrode tip 10 to an altered new position of spot welding point. With this method, the offset value of the position of spot welding point can be determined by calculation so that correction of the position of spot welding point can be accomplished easily and the workability of the positioning operation can be thereby improved. After step $SS5_2$ has been accomplished, step S6 in FIG. 2 can be performed to store the corrected position of spot welding point as teaching data in the memory.

Figure 7:
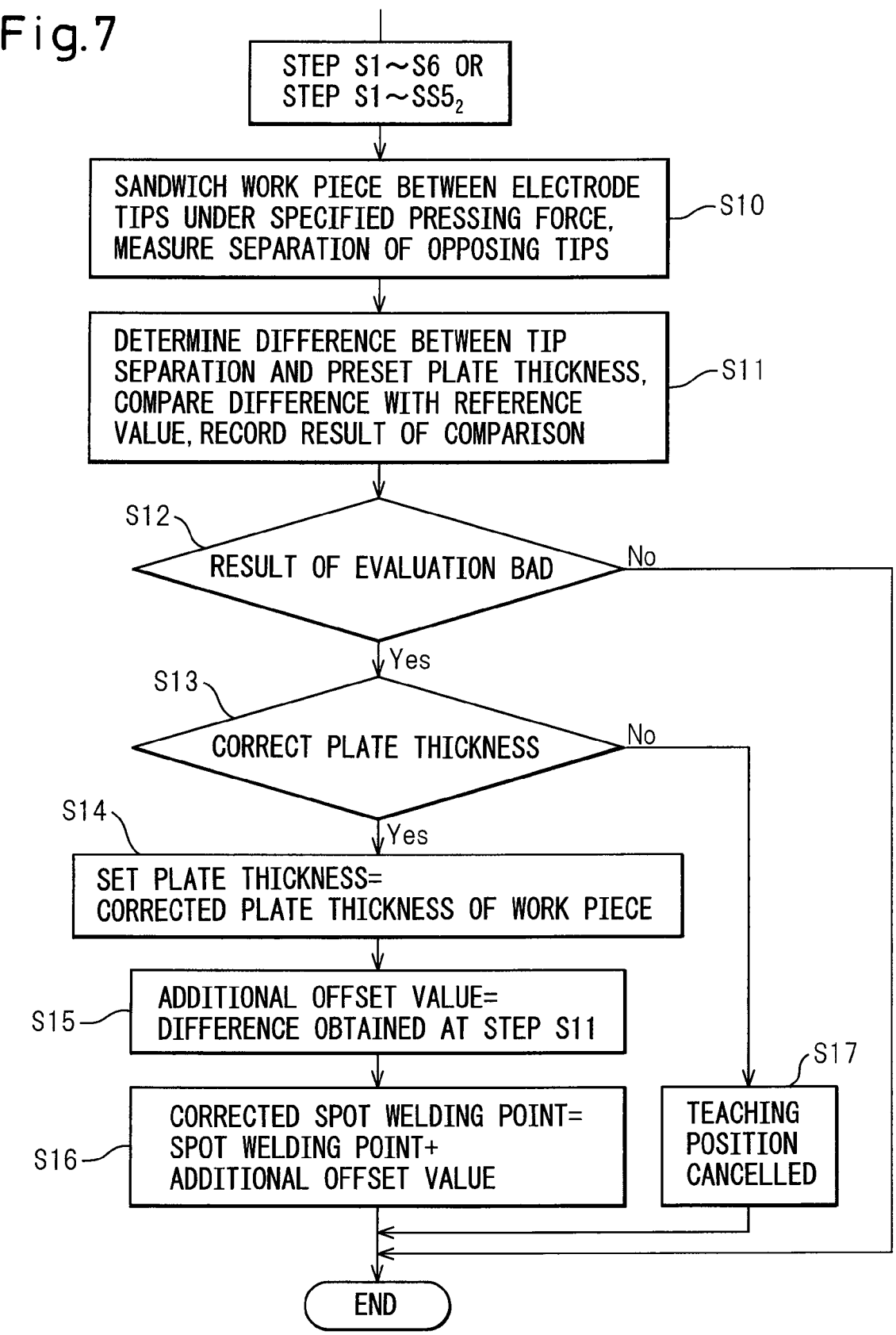
FIG. 7 is a flow chart of a method of correcting the position of spot welding point of the opposition electrode tip when the preset plate thickness of the work piece is altered.

Next, a method of correcting the position of spot welding point when there is departure of actual plate thickness t2 from initially set plate thickness t1 of work piece 12 due to change or variation of plate thickness of work piece 12. This correction process has steps S10-S17 as shown in FIG. 7.

Figure 8A:
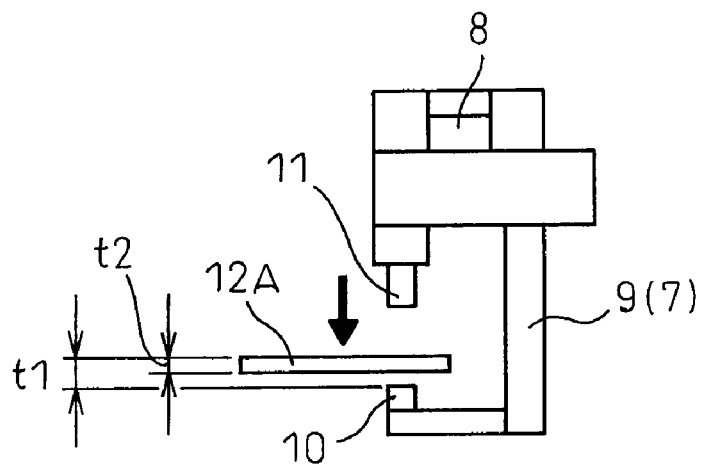
FIG. 8A is a view of the opposition electrode tip positioned separated from the upper surface of the work piece by the preset plate thickness t1 in order to correct the teaching position of the opposition electrode tip.
Figure 8B:
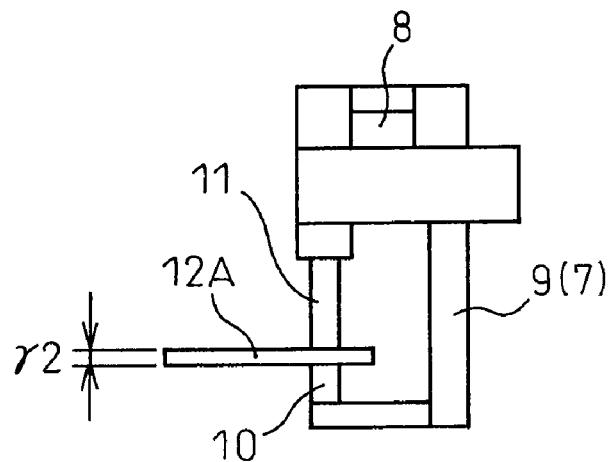
FIG. 8B is a view showing the closed separation of the opposing tips when the work piece is sandwiched by two electrode tips.

The process performed according to steps S1-S6 showing in FIG. 2 or steps S1-$SS5_2$ showing in FIG. 5 is performed in accordance with preset plate thickness t1 so that, if it differs from actual plate thickness t2, opposition electrode tip 10 is positioned, as shown in FIG. 8A, at a position separated from the upper surface of work piece 12A by preset plate thickness t1. At step S10, as shown in FIG. 8B, work piece is sandwiched between opposition electrode tip 10 and movable electrode tip 11 such that the external torque disturbance reaches a value equivalent to the prescribed pressing force, and closed separation γ2 of opposing tips between opposition electrode tip 10 and movable electrode tip 11 is measured. Then at step S1, difference value between closed separation γ2 of opposing tips and preset plate thickness t1 of work piece 12A is determined, and the difference value is compared with a predetermined reference value and the result of the comparison is recorded. In order to reduce operating time, it is also possible to perform the operation at step S5 or $SS5_2$ and the displacement of movable electrode tip 11 at step S10 simultaneously. It is to be understood that, in this case, step S6 is performed simultaneously with step S5 or $SS5_2$.

At step S12, the difference value is compared with the reference value, and if the difference value is less than the reference value, the process is terminated with the teaching position of opposition electrode tip 10 left uncorrected. If the difference value is equal to or greater than the reference value, the process proceeds to step S13.

At step S13, it is determined whether or not the initially set plate thickness t1 of work piece 12A should be corrected to a newly set plate thickness, and if it is determined that initially set plate thickness t1 is not corrected, the process proceeds to step S17 to cancel the teaching position of opposition electrode tip 10, and the method at steps S5~S6 is used to determine the position of spot welding point again. In this case, it is possible to cancel the teaching position and to sound an alarm simultaneously. By sounding the alarm, it is possible to caution an operator that correction of the position of spot welding point is required. If it is determined that initially set plate thickness t1 should be corrected, the process proceeds further to step S14.

At step S14, closed separation γ2 of the opposing tips is regarded as altered plate thickness t2, and this is used as a newly set plate thickness t2. At step S15, the difference value obtained at step S11 is used as an additional offset value ϵ2.

Figure 8C:
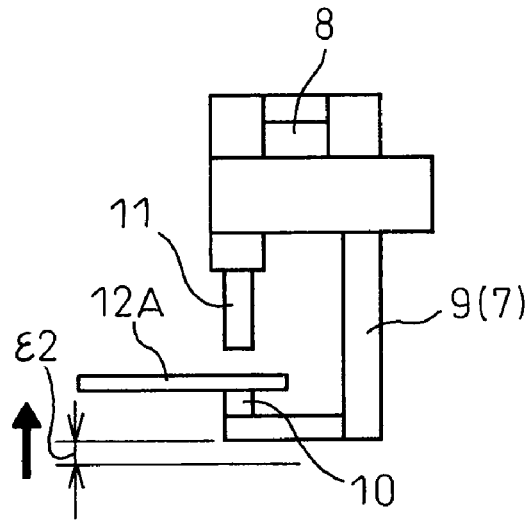
FIG. 8C is a view of the opposition electrode tip shifted upward by an additional offset value ∈2.

Finally, at step S16, as shown in FIG. 8C, offset value ϵ2 is added to the position of spot welding point of opposition electrode tip 10 to obtain a new position of spot welding point of opposition electrode tip 10. In this manner, when preset plate thickness t1 of work piece 12 is altered, by correcting the position of spot welding point of opposition electrode tip 10, even if there is subtle change in the plate thickness of work piece 12A, it is possible to respond flexibly and to improve reliability of the welding quality.

Figure 9:
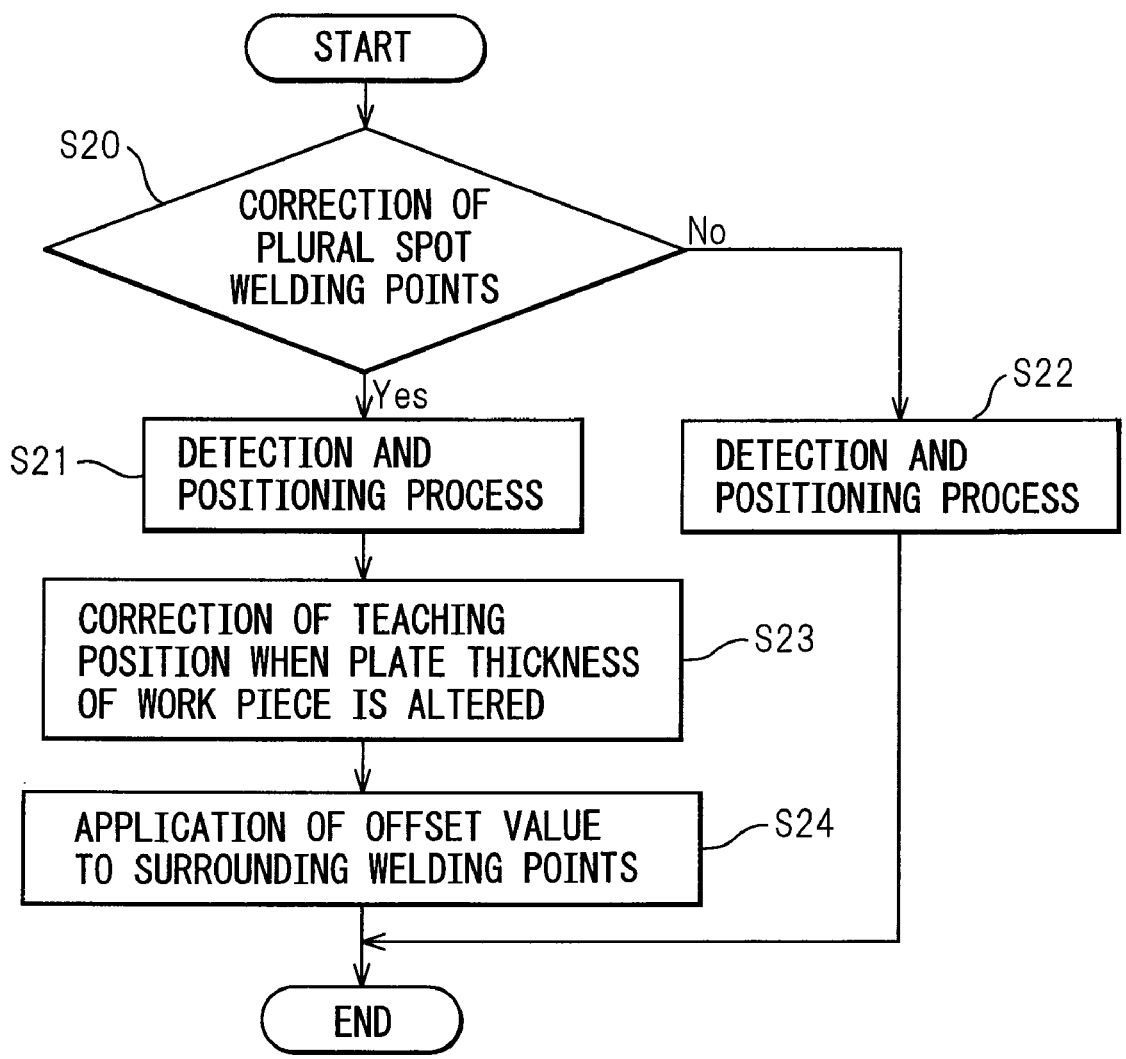
FIG. 9 is a flow chart of a method of correcting the position of spot welding point of the opposition electrode tip when there are a multiplicity of welding locations in the work piece.

Next, FIG. 9 is a flow chart showing a method of correcting the teaching position of opposition electrode tip 10 when there are a multiplicity of welding locations in the work piece. In this flow chart, the steps common to the flow chart shown in FIG. 2 are described in simplified form.

At step S20, it is determined whether or not the positions of spot welding point of opposition electrode tip 10 for a multiplicity of welding locations should be collectively corrected. If it is determined that correction is not performed collectively, the process proceeds to step S22, and the position of spot welding point of opposition electrode tip 10 is determined individually for each welding point. If it is determined that correction should be performed collectively, process proceeds to step S21. At step S22, the method shown in FIG. 7 is used to determine the corrected position of spot welding point of opposition electrode tip 10 for each of individual welding locations.

At step S23, the method shown in FIG. 7 is used for one welding location to correct the position of spot welding point as the teaching point of opposition electrode tip 10, and the offset value is stored in robot controller 2. At step S24, the offset value obtained at step S23 is added to the teaching positions of opposition electrode tip 10 for individual welding locations to perform the position correction. The position correction is successively performed for all the welding locations, and the process is terminated. In this manner, new positions of spot welding point of opposition electrode tip 10 for a multiplicity of welding locations can be obtained collectively, and time required for positioning operation can be substantially reduced.

As has been described above, in accordance with the present embodiment, the teaching position of opposition electrode tip 10 of the spot welding gun can be easily and accurately determined. In addition, in case where the position or the plate thickness of work piece 12 is altered, simple numerical calculation can be used to correct the position of spot welding point. In case where there are a multiplicity of welding locations in work piece 12, the offset value obtained for one location can be applied to correct the positions of spot welding point for a multiplicity of welding locations, so that correction of positions of spot welding point for a multiplicity of welding locations can be performed collectively. In this way, positioning precision can be improved, and reliability of welding quality of spot welding using a spot welding robot can be increased, and applicable range of a spot welding robot can be expanded.

The present invention is not limited to the above-described embodiment, but can be implemented in various modifications without departing from the scope and spirit of the invention.

The invention claimed is:

1. A positioning method of spot welding robot comprising a welding gun having a movable electrode tip capable of being moved forward and backward by means of a servo motor and an opposition electrode tip opposed to said movable electrode tip so as to sandwich a work piece, for positioning said opposition electrode tip at a position of a spot welding point in contact with a lower surface of said work piece, said method comprising:

(A) moving said welding gun with a separation between said opposition electrode tip and said movable electrode tip kept open and larger than a preset plate thickness of said work piece so as to position said opposition electrode tip and said movable electrode tip on both sides of said work piece in a plate-thickness direction of said work piece, respectively, and temporarily positioning said opposition electrode tip at a stand-by position;

(B) moving said movable electrode tip in a direction approaching toward said opposition electrode tip while monitoring a current value of said servo motor driving said movable electrode tip, and when said current value exceeds a prescribed value, determining that a distal end of said movable electrode tip has been brought into contact with said work piece, stopping a movement of said movable electrode tip, and measuring an open separation of two opposing tips between said movable electrode tip and said opposition electrode tip that has been temporarily positioned at said stand-by position; and, (C) determining a difference value by subtracting said preset plate thickness of said work piece from said open separation of said two opposing tips, and moving said opposition electrode tip in a direction approaching toward said movable electrode tip from said stand-by position to said position of said spot welding point to finally position said opposition electrode tip, by using said difference value as an amount of movement of said opposition electrode tip.

2. A positioning method of spot welding robot according to claim 1,
wherein said position of said spot welding point is used as a teaching position of said spot welding robot.

3. A positioning method of spot welding robot according to claim 1,
wherein said method further comprises:
moving said movable electrode tip in the direction approaching toward said opposition electrode tip positioned at said position of said spot welding point, and with said work piece interposed between said opposition electrode tip and said movable electrode tip, sandwiching said work piece under a predetermined pressing force, measuring a closed separation of said two opposing tips between said opposition electrode tip and said movable electrode tip, and determining a difference value by subtracting said preset plate thickness of said work piece from said closed separation of said two opposing tips; and,
comparing said difference value with a predetermined reference value, and if said difference value is greater than said predetermined reference value, sounding an alarm.

4. A positioning method of spot welding robot according to claim 3,
wherein a result of the comparison of said difference value with said predetermined reference value is stored as a record so as to permit review of said result.

5. A positioning method of spot welding robot according to claim 3,
wherein said closed separation of opposing tips is used as a newly set plate thickness of said work piece, and said position of said spot welding point is corrected based on said difference value.

6. A positioning method of spot welding robot according to claim 5,
wherein said opposition electrode tip is positioned at said corrected position of said spot welding point.

7. A positioning method of spot welding robot comprising a welding gun having a movable electrode tip capable of being moved forward and backward by means of a servo motor and an opposition electrode tip opposed to said movable electrode tip so as to sandwich a work piece, for positioning said opposition electrode tip at a position of a spot welding point in contact with a lower surface of said workpiece, said method comprising:

(A) moving said welding gun with a separation between said opposition electrode tip and said movable electrode tip kept open and larger than a preset plate thickness of said work piece so as to position said opposition electrode tip and said movable electrode tip on both sides of said work piece in a plate-thickness direction of said work piece, respectively, and temporarily positioning said opposition electrode tip at a stand-by position;

(B) moving said movable electrode tip in a direction approaching toward said opposition electrode tip while monitoring a current value of said servo motor driving said movable electrode tip, and when said current value exceeds a prescribed value, determining that a distal end of said movable electrode tip has been brought into contact with said work piece, stopping a movement of said movable electrode tip, and measuring an open separation of two opposing tips between said movable electrode tip and said opposition electrode tip that has been temporarily positioned at said stand-by position; and, (C) subtracting from said open separation of said two opposing tips a value obtained by adding a difference value between said stand-by position of said opposition electrode tip and a position of a spot welding point already taught as a teaching position of said spot welding robot to said preset plate thickness of said work piece to obtain a offset value for said position of said spot welding point, and correcting said position of said spot welding point based on said offset value.

8. A positioning method of spot welding robot according to claim 7,
wherein there are a multiplicity of spot welding locations in said work piece, and said offset value of said position of said spot welding point obtained for one welding location is used as a offset value of said position of said spot welding point for other welding locations.

* * * * *